(No Model.)  2 Sheets—Sheet 1.

G. F. PACKARD.
CHILD'S CRADLE.

No. 587,014.  Patented July 27, 1897.

WITNESSES:
N. Webster Schlater
Minnie E. Schlater

INVENTOR
G. Frederick Packard.
BY Chapin & Denny
his ATTORNEYS.

(No Model.) 2 Sheets—Sheet 2.
G. F. PACKARD.
CHILD'S CRADLE.
No. 587,014. Patented July 27, 1897.
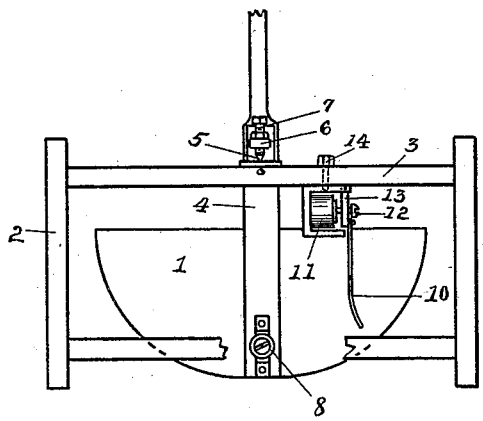
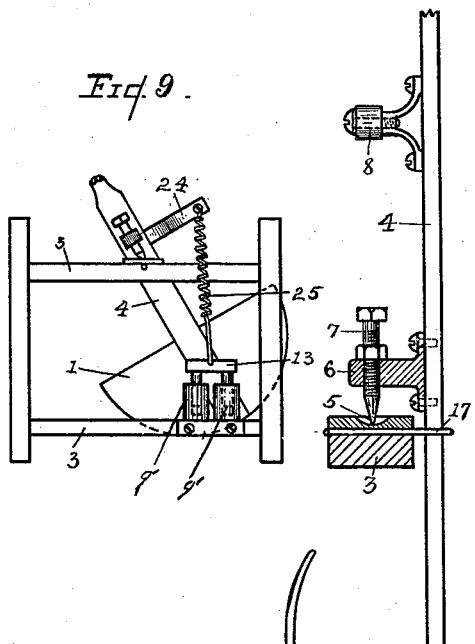
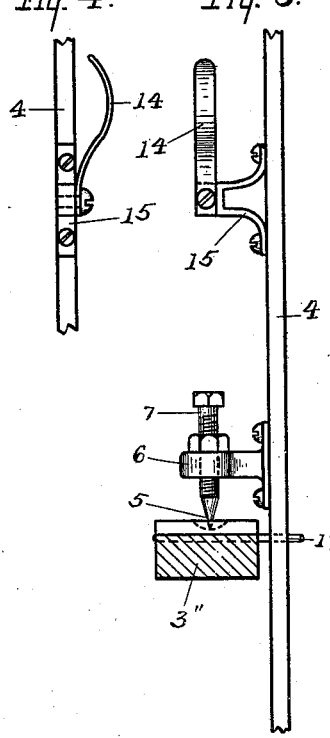
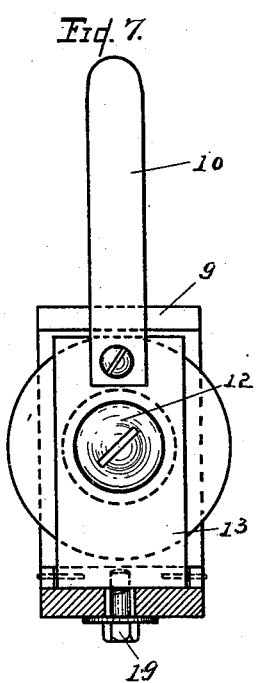
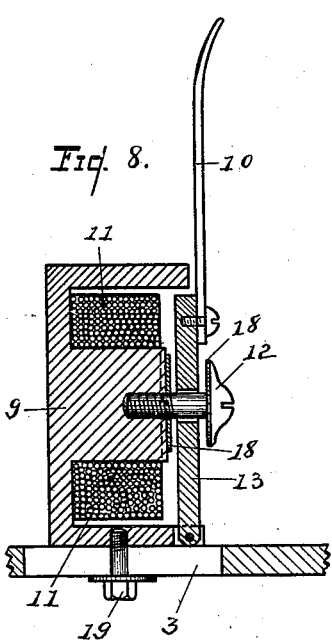
WITNESSES:
N. Webster Schlater
Minnie E. Schlater
INVENTOR
G. Frederick Packard
BY Chapin & Denny
his ATTORNEYS.

UNITED STATES PATENT OFFICE.

GRANVILLE F. PACKARD, OF FORT WAYNE, INDIANA.

CHILD'S CRADLE.

SPECIFICATION forming part of Letters Patent No. 587,014, dated July 27, 1897.

Application filed December 12, 1896. Serial No. 615,449. (No model.)

*To all whom it may concern:*

Be it known that I, GRANVILLE F. PACKARD, a citizen of the United States, residing at Fort Wayne, in the county of Allen, in the State of Indiana, have invented certain new and useful Improvements in Children's Cradles; and I do hereby declare that the following is a full, clear, and exact description of the invention, which will enable others skilled in the art to which it appertains to make and use the same, reference being had to the accompanying drawings, which form part of this specification.

My invention relates to improvements in a child's crib or cradle, first, by pivotally suspending the cradle and counterbalancing it by means of a weighted arm, so that its oscillatory movement can be regulated to quicken or retard the motion and the cradle can be operated with a very slight impelling force either by hand or mechanically-applied power, and, secondly, so that by an electrical appliance it can be automatically operated when once set in motion. I attain these objects by the mechanism illustrated in the accompanying drawings, in which—

Figure 1:
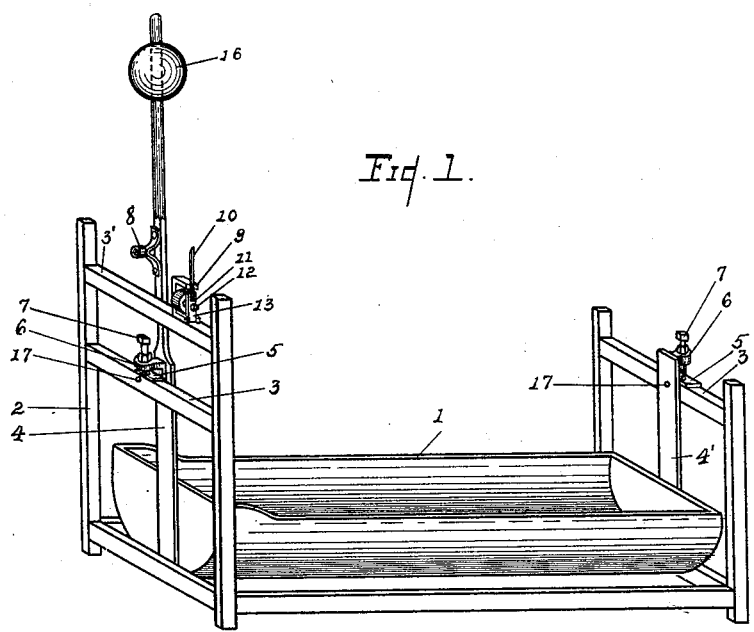
Figure 2:
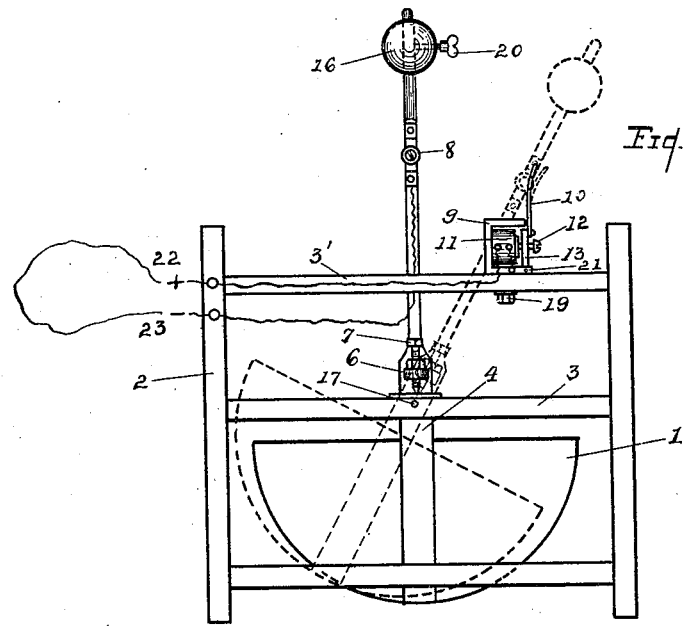

Figure 1 is a perspective view of the cradle and the electrical appliance to be energized by a suitable source of electrical supply. Fig. 2 is a view of the left-hand end of the cradle shown in Fig. 1, with dotted lines showing the contact of the upright arm of the cradle with the spring-armature of the electromagnet when the cradle is in motion. Fig. 3 is also an end view of Fig. 1, showing a modified mode of attaching the electrical appliance. Fig. 4 is a detail front view of a section of the upright arm 4 shown in Fig. 1, with an alternative construction in which a spring 14 is attached to the arm 4 for contact with the armature 13 instead of a roller 8, shown in Fig. 1. Fig. 5 is a detail side view of the alternative construction shown in Fig. 4 and of a section of the arm 4 pivotally mounted upon the supporting-bar 3 shown in Figs. 1, 2, and 3. Fig. 6 is a detail side view of a section of the upright arm 4 of the construction shown in Figs. 1 and 2, with the arm pivotally mounted upon a section of the supporting-bar 3; and Fig. 7 is a side view of an electromagnet motor, showing the magnetic frame and the armature with attached spring. Fig. 8 is a sectional end view of Fig. 7; and Fig. 9 is an end view of the cradle, showing a modified form of attaching the electromagnet to the arm of the cradle-hanger.

Similar numerals refer to similar parts throughout the several views, in which—

1 is the cradle, rigidly attached to the upright hangers 4 and 4' and suspended in a suitable frame 2 upon supporting cross-bars 3 3, and, in the construction shown in Fig. 1, a second cross-bar 3' at one end. The upright hanger 4 is prolonged on an extended arm above the cradle-frame and has at its upper end an adjustable weight 16, secured to the arm by a set-screw 20, by means of which the weight can be adjusted upon the arm at any suitable distance from its upper end. To the hanger 4 is secured by screws or bolts a bracket 6, a screw-threaded bolt 7, having a pointed lower end which pivotally rests in a hardened-metal seat 5, secured to the upper side of the supporting-bar 3. The hanger 4' is provided with a like bracket and metal seat. (Shown in Fig. 1.) By this construction the cradle is pivotally mounted upon the supporting-bars 3 3 of the cradle-frame.

To secure the hangers from being displaced from their bearings on the bars 3 3, spindles or journals 17 17 are secured to the said bars beneath the metal seats 5 5 and extended and loosely journaled in the hangers 4 and 4'. These journals are not intended for supporting the hangers, which, as already described, are pivotally mounted upon the bolts 7 7, but are for the purpose of securing the cradle from being dismounted. The perforations in the hangers in which the journals 17 and 17 are inserted should be slightly elongated laterally to permit a free movement of the hanger when the cradle is swung or oscillated. Being so near the fulcrum-points of the pivots 7 7 the lateral enlargement of these perforations may be very slight to admit of the free movement of the hanger back and forth so long as the electric current is supplied.

The weight 16 being vertically movable upon the arm of the hanger can be so adjusted as to counterbalance the weight of the cradle and its burden and the beat or swing of the cradle accelerated or retarded, as desired.

By reason of the counterbalance of the weight 16 the force necessary to swing the cradle is so reduced that the cradle can be also easily rocked or oscillated without the use of the electric current or any other mechanical power.

Instead of using the roller 8 a spring 14 can be substituted, as shown in Figs. 4 and 5, if preferred, and the spring 10 and armature 13 can be integral. If the spring 14, attached to the arm of the hanger, is used, the armature extension instead of being an elastic spring can be made rigid.

Instead of placing the electromagnet upon the upper side of the cross-bar 3' it can be attached to the under side of the supporting-bar 3, as shown in Fig. 3, and the bracket upon which the roller 8 is mounted can be attached to the lower part of the hanger or crib. Its mode of operation when so constructed will be readily understood without a detailed description.

The modified form shown in Fig. 3 I deem preferable, as the cross-bar 3' can then be omitted and the apparatus be made more compact, and thus occupy less space.

It is obvious that the form of the frame 2 can be varied without departing from the scope of my invention, as likewise the mode of attaching the hangers to the cradle.

The source of electric supply may be from ordinary batteries or from the lamp-supply (direct or alternating current) where electric lights are used for illuminating purposes.

Upon the prolonged arm of the hanger 4 is secured a suitable bracket, having mounted upon it a metallic roller 8, for the purpose hereinafter described. An electromagnet consisting of a magnet-frame 9, a magnetizing-coil 11, and a pivoted armature 13, journaled in the base of the magnet-frame in a plane transverse to the magnet-core, (shown in Fig. 8,) is rigidly secured to the cross-bar 3' by the screw-threaded bolt 19.

A metallic spring 10 is rigidly secured to the armature 13, adapted to engage with the roller 8 when the hanger 4 is swung from its vertical position toward the electromagnet located as described. A screw-threaded bolt 12, with a flange-head, passes through a perforation in the armature and screws into the core of the magnet-frame 9. Washers 18 18 of any suitable material, like rubber or felt, are mounted upon the bolt 12 upon each side of the armature for the purpose of deadening the sound of contact of the armature with the head of the bolt 12 and the core of the magnet-frame as it vibrates between them. This bolt answers the purpose of a stroke-limiting device when the hanger-arm 4 oscillates against the spring 10 and forces the armature outwardly.

From any electrical source of supply, as a battery, wires 22 and 23 are connected, one, 22, to the coil 11 and the other to the metallic roller 8, and one end of the coil 11 is connected to the iron frame of the magnet. When the hanger 4 is swung from the perpendicular, so as to bring the roller 8 in contact with the spring 10, the electric circuit will be closed and the energized magnet will draw the armature 13 to its limit against the magnet, and the spring 10 will be forced against the roller 8, thus giving an additional impulse to the hanger that will cause it to swing to the other extreme, and when, impelled by gravity of the suspended cradle, it swings back the same result will be repeated, and the cradle will automatically oscillate back and forth. The dotted lines in Fig. 2 show the position of the cradle, the hanger-arm 4, and the armature-spring 10 when the hanger is swung to the limit against the armature-spring.

It is obvious that the particular form of the spring employed in connection with the armature is immaterial and may be variously modified, as shown in Fig. 9, where the armature is connected to a rigid lateral arm 24 on the cradle-standard 4 by a coiled retracting-spring 25. Instead of the form of electromagnet shown in Fig. 8 one or more solenoids 9' may be used and a connecting-bar of iron or armature 13 rigidly connected to the upper ends of the solenoid-cores. In this arrangement of the operating parts the working circuit is so arranged that it will be momentarily closed at or near one limit of the cradle's oscillation, thereby energizing the solenoids and giving the solenoid-cores such a magnetic pull against the tension of said spring as to accelerate the movement of the cradle through the medium of the retracting-spring 25.

As the cradle starts upon its return oscillation the circuit will be broken and the said cores, under the tension of the retracting-spring, will resume their normal position, as shown in Fig. 9.

It is apparent that the particular form of the spring employed or the position or relative arrangement of the magnet may be variously modified without departing from the spirit and scope of my invention, which consists of such an arrangement of electromagnet or solenoids and armature-spring as to actuate the cradle at or near one limit of its oscillation through the agency of an electrical impulse.

Having thus described my invention, what I claim as new, and desire to secure by Letters Patent, is—

1. A child's cradle having an upright hanger at each end pivotally suspended upon a suitable frame and adapted for an oscillatory movement thereon, a supporting-bracket secured to each hanger having an adjustable vertical bolt mounted therein seated at its lower end upon a metal plate secured to said frame, a journal passing through a supporting-bar of the frame below the bearing of said bolt and loosely journaled in the hanger, and one of said hangers having an extended upright arm with a counterbalance-weight adjustable upon said arm to regulate the oscillation of the cradle, and the cradle-frame, all arranged substantially as described and shown.

2. A child's cradle pivotally suspended in a suitable frame, with means for actuating the same, comprising a spring-armature pivotally attached to an electromagnetic frame across the arc of oscillation of the cradle, and adapted to accelerate the motion of said cradle at each alternate oscillation under the influence of an electromagnet as described, an electromagnet connected in the working circuit and adapted to actuate the said armature when the magnet is energized, by closing the circuit in combination with the frame all arranged substantially as described and shown and for the purpose stated.

3. In an electrically-operated child's cradle, the combination of a supporting-frame, a cradle pivotally suspended in said frame and adapted for an oscillating movement, and having an upright extended arm with a counterbalance adjustable weight thereon, an electromagnet attached to said frame having a spring-armature pivotally mounted in the magnet-frame in the path of oscillation, and connected in electrical circuit with the electromagnet and adapted to accelerate the movement of said cradle at each alternate oscillation thereof under the influence of the electromagnet, by the contact of the spring-armature with a spring upon the upright arm of the cradle, whereby the electric circuit is closed substantially as described and shown.

4. In an electrically-operated child's cradle or crib, the combination of a supporting-frame, a cradle or crib pivotally suspended in said frame and adapted for an oscillating movement and having an upright extended arm with a counterbalance adjustable weight thereon, an electromagnet fixed to said frame and having a spring-armature pivotally mounted in the electric magnet-frame in the path of oscillation, and connected in electrical circuit with the magnetic coil, and adapted to accelerate the movement of said crib at each alternate oscillation thereof under the influence of the electromagnet by the contact of the spring-armature, with a roller upon the upright arm of the crib, whereby the electric circuit is closed substantially as described and shown.

5. In an electrically-operated child's cradle or crib, the combination of a supporting-frame, a cradle or crib pivotally suspended thereon, and adapted for an oscillating movement, and having an upright extended arm with a counterbalance adjustable weight thereon, an electromagnet fixed to said frame and having an armature pivotally mounted in the frame of the electromagnet in the path of oscillation, and connected in electrical circuit with the electromagnet and adapted to accelerate the movement of said crib at each alternate oscillation thereof, under the influence of the energized electromagnet, by the contact of the armature with a spring fixed to the crib or cradle as shown when the electric circuit is closed, all arranged as described and shown.

6. In an electrically-operated child's cradle, the combination of a cradle having an upright hanger at each end pivotally suspended upon a suitable frame and adapted for an oscillating movement therein, with means by an adjustable weight to regulate the oscillatory movement of the cradle when in motion, a supporting-bracket secured to each hanger having an adjustable vertical bolt mounted therein seated at its lower end upon a suitable metal plate secured to said frame, a journal mounted in the supporting-bar of the frame under the metal plate aforesaid and loosely journaled in the hanger to prevent its lateral displacement, and an electromagnet having a pivotally-mounted armature so arranged that by a contact of the cradle when oscillated with the said magnet the electrical circuit will be closed and an accelerated impulse be given to the oscillating movement of the cradle as described and shown and for the purpose stated.

7. In an electrically-operated child's cradle, the combination of a cradle having an upright hanger at each end pivotally suspended upon a suitable frame and adapted for an oscillating movement therein with means by an adjustable weight to regulate the oscillatory movement of the cradle when in motion, a supporting-bracket secured to each hanger having a vertical bolt mounted therein seated at its lower end upon a suitable metal plate secured to said frame, a journal mounted in the supporting-bar of the frame under the metal plate aforesaid and loosely journaled in the hanger to prevent its lateral displacement and an electromagnetic solenoid placed in such relation to an appropriate armature or plunger that by closing the electric circuit through the magnetizing coil or solenoid, an accelerated impulse will be given to the oscillating movement of the cradle, all substantially as described and shown and for the purpose stated.

Dated at Fort Wayne, Indiana, this 2d day of December, 1896.

GRANVILLE F. PACKARD.

In presence of—
IDA L. ROSS-LEWIN,
AUGUSTUS A. CHAPIN.